Jan. 20, 1970  P. M. McPHERSON  3,490,848
SPECTRAL GRATING APPARATUS
Filed June 24, 1966

INVENTOR.
Paul M. McPherson
BY
Roberts, Cushman & Grover
Attys

United States Patent Office 3,490,848
Patented Jan. 20, 1970

3,490,848
SPECTRAL GRATING APPARATUS
Paul M. McPherson, Acton, Mass., assignor by mesne assignments, to McPherson Instrument Corporation, a corporation of Delaware
Filed June 24, 1966, Ser. No. 560,143
Int. Cl. G01j *3/40, 3/28, 3/12*
U.S. Cl. 356—79
9 Claims

ABSTRACT OF THE DISCLOSURE

A spectrometer in which the image flatness error and the line asymmetry error are simultaneously corrected by locating the grating pivot, not on an axis passing through the grating center, but rather on an axis spaced rearwardly of the front, ruled face of the grating, so that, as the grating rotates, its center and the axis passing through its center move on an arc toward the entrance path.

---

This invention relates to optical grating spectral dispersion systems such as spectroscopes, spectrometers, spectrographs and monochromators and particularly to three reflection dispersion systems.

A classical example of the three reflection system is the Ebert arrangement consisting of entrance and exit slits, a concave mirror and a plane, diffraction grating. Light from the entrance slit is collimated by one portion of the mirror and reflected onto the grating whence it is diffracted to another part of the mirror, the mirror then focussing the diffracted light onto an exit plane.

Another example of a three reflection system is the Czerny-Turner spectrometer having an entrance and an exit slit, a first concave mirror for reflecting the light from the entrance slit onto a plane, diffraction grating, and a second concave mirror for focussing light diffracted from the grating onto an exit plane.

In both of the above systems the grating directly reflects a central image of the entrance slit at an angle equal to the angle of incidence of the collimated light, and also disperses light in colored spectra of ascending orders to each side of the central image. These spectra are focussed by the second reflection on an arc or plane passing through the exit aperture. Parts of the spectra are line images of the entrance slit. A series of these line images is focussed in the focal plane of the reflector. By rotating the grating about its vertical or Z axis parallel to and in the plane of the grating rulings, and passing through the center of the rulings, the spectral images of the entrance slit may be swept across the exit aperture or slit so that various bands or specific lines of the spectra may be selected for presentation at the exit aperture or slit. It should be understood that one or more of the light paths between the slits, reflector and grating may be folded by the addition of one or more reflectors without altering the basic three reflection characteristics of the system.

The Ebert and Czerny-Turner systems were satisfactory in earlier spectral studies when strong light sources could be used at the entrance slit and high speed was not imperative. The systems could have slow optical speeds requiring only small apertures and did not encounter serious off-axis errors resulting from large angles between light rays incident on, and reflected from, the reflectors.

But present experimental needs, among others, are for optically faster systems to study weak and transitory light sources, together with a demand for increased resolution for examination of the fine structure of spectral lines. These requirements are not met by prior systems because of two inherent defects.

The first defect is one of symmetry of individual lines at the exit plane in the focal plane of the final reflector, i.e., the single reflector of the Ebert system or the second reflector of the Czerny-Turner system. Line symmetry means equal energy distribution at each side of the center of a line image of the entrance slit. Only when a line is a faithful symmetric image of the entrance slit can its energy be accurately measured and its fine structure examined. Asymmetry is present when the energy is spread out to one side of the center of the line, and arises from a known inherent optical error. As the grating is rotated from its central image position, the line images formed at a point in the exit plane become increasingly asymmetrical. It is known that, by adjustment, a fixed position of the grating relative to the reflector and entrance and exit planes can be selected such that one particular line image other than central image is symmetrical at a point in the exit plane and the asymmetry of other lines is somewhat reduced.

However, in monochromators, spectrometers and spectrographs it is highly desirable that all line images focussed on a central point in the exit plane be symmetrical, and it is one object of the present invention to provide symmetry for all such line images.

According to one aspect of the invention optical diffraction apparatus for spectral dispersion comprises light entrance means, light exit means, a plane diffraction grating, reflector means opposite the grating and forming with the grating an optical path including an entrance path leading from the entrance means to the reflector means, thence on a reflective path to the grating, on a diffractive path to the reflector means, and on an exit path to the exit means thereby to form a series of spectral images of the entrance means in the focal plane of the reflector means at the exit means, said paths defining an optical plane, and movable means mounting the grating to incline the grating through an angle about an axis normal to said optical plane toward one of said entrance and exit paths and simultaneously to displace said grating axis toward said one path a distance dependent upon said angle effectively to form successive spectral images individually symmetric at a point of said exit means.

A second serious defect in prior spectral dispersion systems, particularly in spectrographs, is curvature of the focal plane. While the locus of the series of spectral image ideally lies in a true plane, the term focal plane is commonly used in optics to describe a series of focussed line images lying on a curve rather than in a true plane. A series of line images lying on a curve cannot be focussed on the flat photographic plate of a spectrograph. It has been found in prior systems that the focal plane of the final reflector is not only curved for all but one position of the grating, but that the curvature changes as the grating rotates, and that the line of curvature rotates with respect to the exit plane. Rotation of the focal plane may cause as great a departure from focus in the exit plane as does curvature of the focal plane, and both result in serious loss of energy and resolution.

It is also an object of the present invention to assure both that all line images of a series are symmetrical at one point of an exit plane and that all line images of the series lie in a truly flat, non-rotating focal plane at the exit plane of a spectrographic system. According to another aspect of the invention these two objects are accomplished together by providing grating mounting means which simultaneously rotate the grating, displace it toward one of the exit or entrance paths and displace it away from the reflector means.

For the purpose of illustration a typical embodiment of the invention is illustrated in the accompanying drawings in which:

FIG. 1a is a plan view of a modified exit slit configuration for the spectrometer of FIG. 1, including an array of exit slits.

Figure 1:
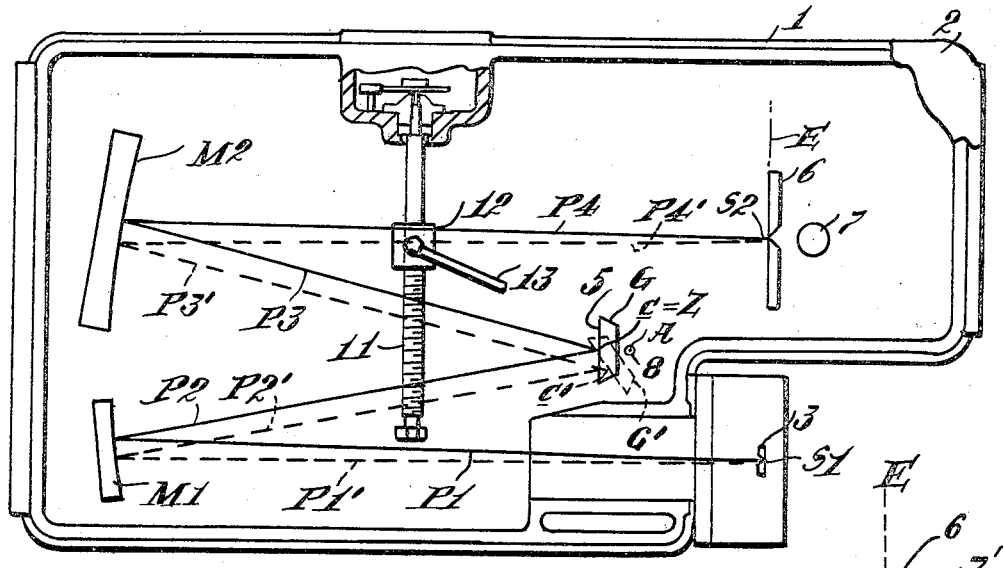
FIG. 1 is a plan view of a Czerny-Turner type of spectrometer showing one grating mount according to the present invention, parts being omitted.
Figure 2:
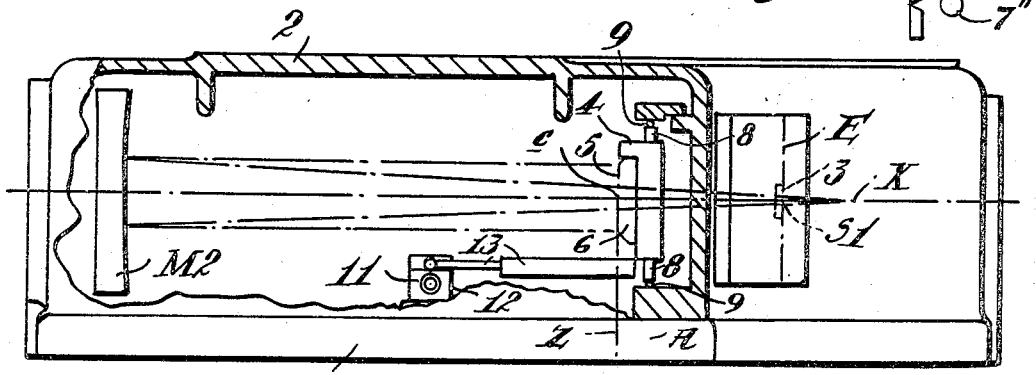
FIG. 2 is a side elevation of the spectrometer of FIG. 1, parts being broken away.

A spectrometer shown in FIGS. 1 and 2 comprises an evacuable housing formed by a base 1 and a cover 2. On or within the base are mounted a mask 3 with a light entrance slit S1, a first curved, e.g. spherical, mirror M1, a rotatable mount 4 (omitted from FIG. 1 for clarity) for a plane, diffraction grating G with a ruled face 5, a second curved mirror M2 and a mask 6 with a light exit slit S2 lying in the exit plane E of the optical system. In the spectrometer shown, the second reflector M2 is approximately twice the size of the first reflector M1 to reflect the spectra which are dispersed by the grating G over an area greater than that of the first mirror M1. Beyond the exit slit is a photomultiplier tube 7 for sensing light transmitted by the slit S2. In a polychromator additional slits and photomultiplier tubes may be provided along the exit plane E. Or in a spectrograph a photographic plate is located in the exit plane E. In a spectroscope an eye piece is substituted; and in a monochromator the exit slit serves as a source of monochromatic light.

The grating mount 4 has a pivot staff 8 supported by ball bearings 9 on the housing base. By a drive mechanism described in my copending application Ser. No. 410,915, filed Nov. 13, 1964, for Optical Apparatus Using Ruled Gratings, the grating mount is rotated back and forth approximately 40° so that the grating swings between a central image position G (solid line) and a high wavelength position G' (broken line) as it is driven by a screw 11 carrying a nut 12 which engages the end of an arm 13 extending from the mount 4.

The ruled face 5 of the grating G has a center point c through which pass three axes customarily designated the X axis, normal to the ruled face, the Z axis, parallel to the rulings of the face, and the Y axis (not shown), normal to the X and Z axes.

The optical components described above form a central ray optical path comprising an entrance path P1 between the entrance slit S1 and the first reflector M1. The first reflector M1 collimates light from the entrance slit and directs it along a reflective path P2 to the grating G. The central ray from the grating G to the exit slit in the central image (solid line) position of the grating is directed along a diffractive path P3 to the second reflector M2 which focusses the ray on an exit path P4. Ideally the second reflector M2 has its focal plane coincident with the exit plane E. When the grating is in deflected position G', the central ray to the exit slit follows similar paths P1' to P4' shown in dotted line. The paths P1 to P4 lie in and define an optical plane through the X axis shown in FIG. 2.

As so far described, the spectrometer operates as follows. Light entering the slit S1 is collimated, dispersed and then focussed in the focal plane of the second reflector M2 as a series of spectral continua and line images of the entrance slit S1. The spectral images are spread out parallel to the optical plane defined by paths P1 to P4, and along the exit mask 6. As the grating is rotated the series of images is swept across the exit slit S2 presenting successive line images at the slit.

In prior systems the two previously mentioned defects would appear at the exit slit S2 and the exit plane E.

Figure 3:
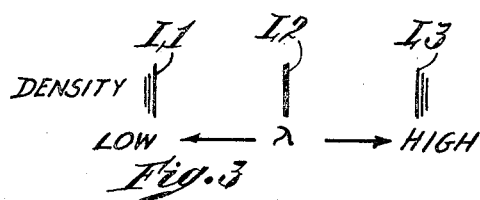
FIG. 3 is a photographic density record of three spectral lines.
Figure 4:
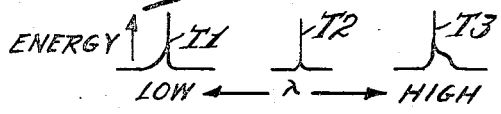
FIG. 4 is a trace of the energy of the three lines of FIG. 3.

First, in prior systems all but one of the spectral line images would be asymmetrical as it passes the slit S2. As shown in FIG. 3 line L2 is a photographic density record of the energy of a line which is symmetric in that its density is equally distributed at each side of its (vertical) center line. Asymmetric lines L1 and L3 have densities blurred or spread out unequally on one or the other side of their centers. The same lines are represented in FIG. 4 as energy level traces T1 to T3 which would be photoelectrically sensed at the exit slit of prior spectrometers. Trace T2 is a true, symmetrical trace of an undistorted line. Trace T1 is skewed toward the lower wavelengths, and trace T3 is skewed toward the higher wavelengths.

Secondly the spectral images at the exit plane would be curved or warped out of the exit plane at all positions of the grating except one. That is, as the grating were rotated the spectral images would curve out of the plane E of the exit slit and rotate relative to the exit plane E. Thus not all of the images would be in focus on the exit plane, and a photographic plate exposed in the exit plane would record indistinct spectral lines.

In the spectrometer shown in FIGS. 1 and 2, the image flatness error and the line asymmetry error are simultaneously corrected by locating the grating pivot 8, not on its Z axis passing through the center c, but rather on an axis A spaced rearwardly of the front, ruled face of the grating along axis X, so that, as the grating rotates, its center and Z axis move on an arc toward the entrance path P1 between the position c and c'. Consequently, for different angular positions of the grating G the center is displaced toward the entrance path P1 and away from the reflectors M1 and M2. If the grating is rotated toward the exit path P4, the displacement of the grating center c and axis Z is toward the exit path P4. In either case the simultaneous rotation and lateral displacement toward the entrance or exit path results in the formation of extremely sharp symmetric line images at the exit slit S2. Furthermore the grating center c moves away from the mirrors M1 and M2, that is, away from a plane through their centers, and thereby causes all the line images of the series to lie in a flat focal plane of mirror M2, which focal plane is coincident with the exit plane E. Thus, not only will all line images at a point of the exit plane be symmetric, but also all the line images will be in focus in the exit plane. Preferably the series of images focussed by the second mirror M2 will be centered on the exit slit in the case of a monochromator or the spectrometer shown. In a spectrograph an aperture for a photographic plate is substituted for the slit mask 6, and the spectral series is centered approximately on the center of the aperture. In a polychromator having an array of slits and phototubes, the spectral series is centered on the centermost slit of the array. In each of these instances the simultaneous rotation, lateral movement and displacement of the grating center away from the mirrors results in forming symmetric line images at a point, preferably the center, of the exit plane, and in the case of a spectrograph or polychromator all or several line images may be photographed or detected in focus along the exit plane.

A spectrometer suitable for carrying out the present invention may have the centers of mirrors M1 and M2 and slits S1 and S2 symmetrically disposed at the corners of a rectangle, the long side, or focal length of mirror M2, being one-half meter, the short side, or slit spacing, 7⅛ inches, the center c of the grating in central image position being spaced 5 5/16 inches from a plane through the slits S1 and S2, and the pivot axis A being offset 1⅚₁₆ inches behind the center c of the grafting. The symmetric system is shown for the purposes of clarity, but asymmetric systems may be used, and reflectors disposed in paths P1 and P4 to fold the paths while maintaining the same path length.

Figure 5:
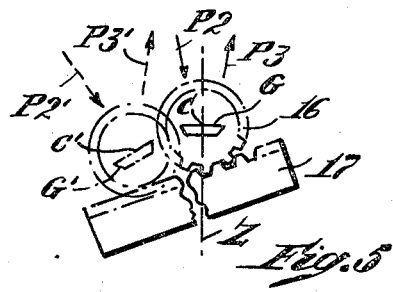
FIG. 5 is a plan view of another grating mount according to the invention.

While in FIGS. 1 and 2 an offset pivot 8 is employed to produce simultaneous rotation and two displacements, these movements may also be produced by the grating mount shown in FIG. 5. Herein the grating G is mounted on a toothed wheel meshing with the teeth of a rack 17 inclined about 20° to the Z axis of the grating when in the solid line central image position. When the gear is rolled along the rack by any suitable drive, the grating G rotates toward the reflective path P2 and entrance path P1 (not shown) and the grating center moves toward path P1 and away from the mirror M1, from which path P2 leads, and M2, to which path P3 leads. The gear diameter, tooth pitch and rack inclination are selected to produce the same rotation and total displacement as does the offset pivot of FIGS. 1 and 2. If a flat focal plane is not required the rack may be fixed at right angles to the entrance path P1 so that only lateral movement of the grating center toward the entrance path is produced. Such displacement will produce the previously described symmetry of line images at the exit slit S2.

With the spectrometer described, the improvement in symmetry of spectral line images is marked. The total energy of all lines from 1100 to 10,000 angstroms, for example, is concentrated at the exit slit in sharp, symmetrical images with improved half width and base width. Half width means the width in angstrom units of a line energy trace at one half the peak energy of the trace. Base width is the width of a line trace at its base where the energy reaches zero or the level of an overlying continuum. Half width and base width are measures of the quality of line profile. For example, at 5461 angstroms, the base width of the line trace in the present instrument is three times, and at 8716 angstroms four times, narrower than in a comparable prior instrument. With such improved line profile, the fine structure of lines may be studied and extremely clear spectra photographed.

I claim:

1. Optical diffraction apparatus for spectral dispersion comprising,
    light entrance means,
    light exit means,
    a uniformly ruled plane diffraction grating,
    reflector means opposite the grating and forming with the grating an optical path including an entrance path leading from the entrance means to the reflector means, thence on a reflective path to the grating, on a diffractive path to the reflector means, and on an exit path to the exit means thereby to form a series of spectral images of the entrance means in the focal plane of the reflector means at the exit means, said paths defining an optical plane,
    and movable means mounting the grating to incline the grating through an angle about an axis normal to said optical plane toward one of said entrance and exit paths and simultaneously to displace said grating axis toward said one path a distance dependent upon said angle, said mounting means comprising a support for the grating including pivot means having a pivot axis offset from the aforesaid grating axis, parallel to the grating axis and normal to said optical plane, said pivot axis being disposed to swing said grating axis on an arc extending toward said one path and away from said reflector means while simultaneously rotating the grating around its axis, effectively to form successive spectral images individually symmetric at a point of said exit means.

2. Apparatus according to claim 1 wherein the point of said light exit means is a slit at which said symmetric spectral images are formed.

3. Optical diffraction apparatus for spectral dispersion comprising
    light entrance means,
    light exit means lying in a plane,
    a uniformaly ruled plane diffraction grating,
    reflector means opposite the grating and forming with the grating an optical path including an entrance path leading from the entrance means to the reflector means, thence on a reflective path to the grating, on a diffractive path to the reflector means, and on an exit path to the exit means thereby to form a series of spectral images of the entrance means in the focal plane of the reflector means at the exit means, said paths defining an optical plane,
    and movable means mounting the grating to incline the grating through an angle about an axis normal to said optical plane toward one of said entrance and exit paths and simultaneously to displace said grating axis toward said one path and simultaneously to displace said grating axis away from said reflector means a distance dependent upon said angle effectively to form a series of spectral line images individually symmetric at a point of said exit means, with all line images lying in a flat, non-rotating focal plane at the plane of the exit means.

4. Apparatus according to claim 3 comprising a spectrograph wherein said light exit means is a photographic plate aperture, said point being located at approximately the center of said aperture.

5. Apparatus according to claim 3 comprising a polychromator wherein said light exit means is an array of exit slits, said point being located at approximately the center of the array.

6. Optical diffraction apparatus for spectral dispersion comprising a light entrance slit, light exit means defining an exit plane, a first reflector formed of a spherical mirror, a second reflector formed of a spherical mirror and a uniformly ruled plane diffraction grating having a Z axis; said slit, exit means, mirrors and grating being mounted on a base and defining an optical path including an entrance path leading from the slit to the first reflector, thence on a reflective path in which light from the slit falling on the first reflector is collimated by the first reflector and directed to the grating, a diffractive path on which light is dispersed from the grating to the second reflector in a series of spectral lines, and on an exit path in which the second reflector focusses a series of spectral line images of the entrance slit in the focal plane of the second reflector, said paths defining an optical plane and said grating Z axis being disposed normal to said plane; a support having a pivot on said base to incline the grating about its Z axis toward one of said entrance and exit paths and simultaneously to displace the grating Z axis on an arc extending toward said one path and away from a plane intercepting said first and second reflectors, whereby said inclination of the grating about its Z axis causes the series of spectral line images to sweep parallel to said optical plane along said exit plane through a point intermediate the ends of said exit means, said second reflector forming symmetric images of said lines at said point, and all the line images lying in a flat, non-rotating plane coincident with the plane of the exit means.

7. Apparatus according to claim 6 wherein the point of said light exit means is a slit at which said symmetric spectral images are formed.

8. Apparatus according to claim 6 comprising a spectrograph wherein said light exit means is a photographic plate aperture, said point being located at approximately the center of said aperture.

9. Apparatus according to claim 6 comprising a polychromator wherein said light exit means is an array of exit slits, said point being located at approximately the center of the array.

(References on following page)

References Cited

UNITED STATES PATENTS

| | | |
|---|---|---|
| 3,011,391 | 12/1961 | Fostie. |
| 3,062,089 | 11/1962 | Martin. |
| 3,216,315 | 11/1965 | Keller. |
| 3,298,275 | 1/1967 | DuBois et al. |
| 3,334,956 | 8/1967 | Staunton. |
| 2,975,669 | 3/1961 | Jarrell et al. _____ 356—79 |
| 3,414,355 | 12/1968 | Fostie et al. _____ 356—100 |

RONALD L. WIBERT, Primary Examiner

F. L. EVANS, Assistant Examiner

U.S. Cl. X.R.

350—162; 356—98, 100